May 25, 1965  M. M. ROSENFELD  3,185,873
GENERATOR AND VENTILATION MEANS
Filed Oct. 19, 1961  2 Sheets-Sheet 1
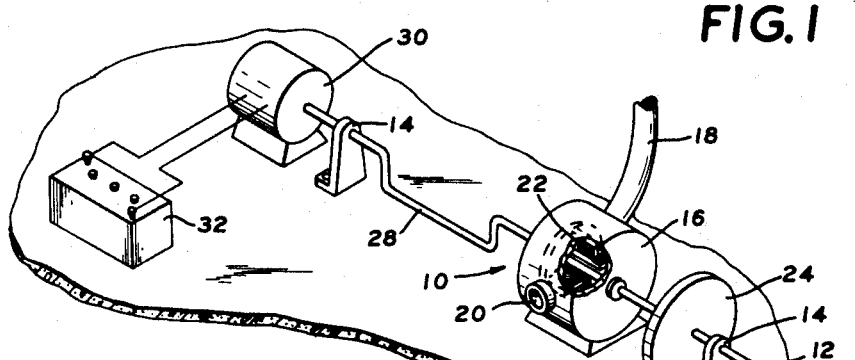
FIG.1
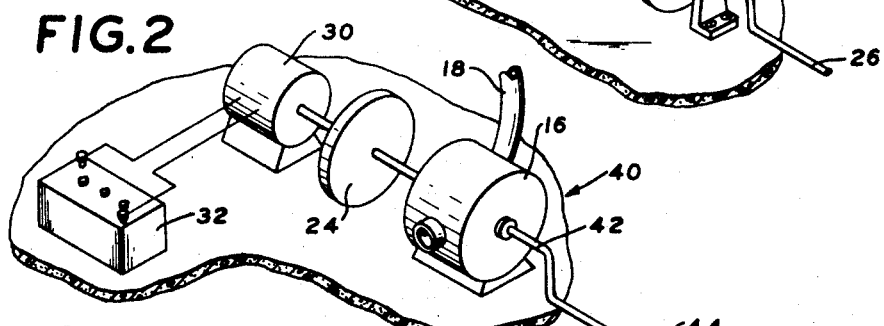
FIG.2
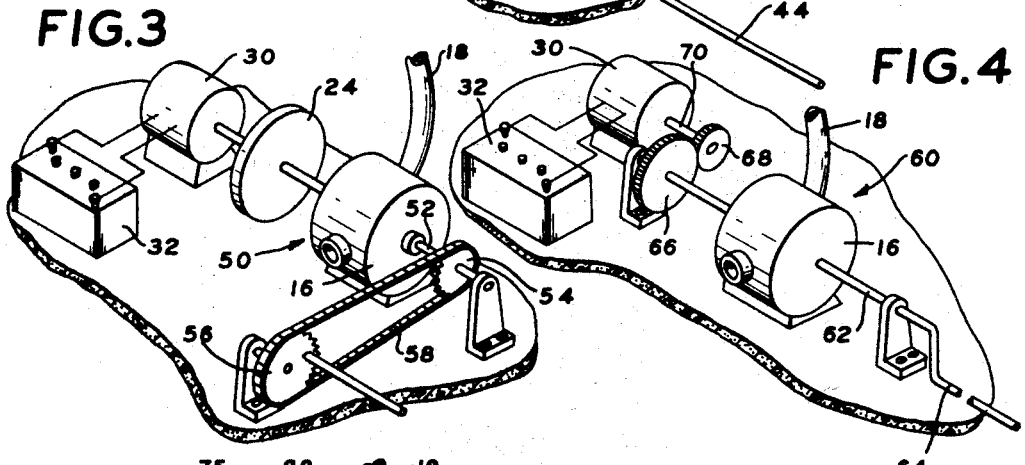
FIG.3  FIG.4
FIG.5
INVENTOR.
MORTON M. ROSENFELD
BY
Arthur H. Seidel
ATTORNEY May 25, 1965     M. M. ROSENFELD     3,185,873
GENERATOR AND VENTILATION MEANS
Filed Oct. 19, 1961             2 Sheets-Sheet 2
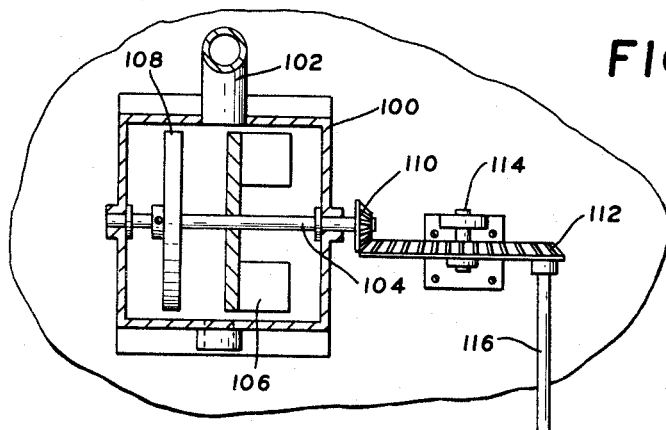
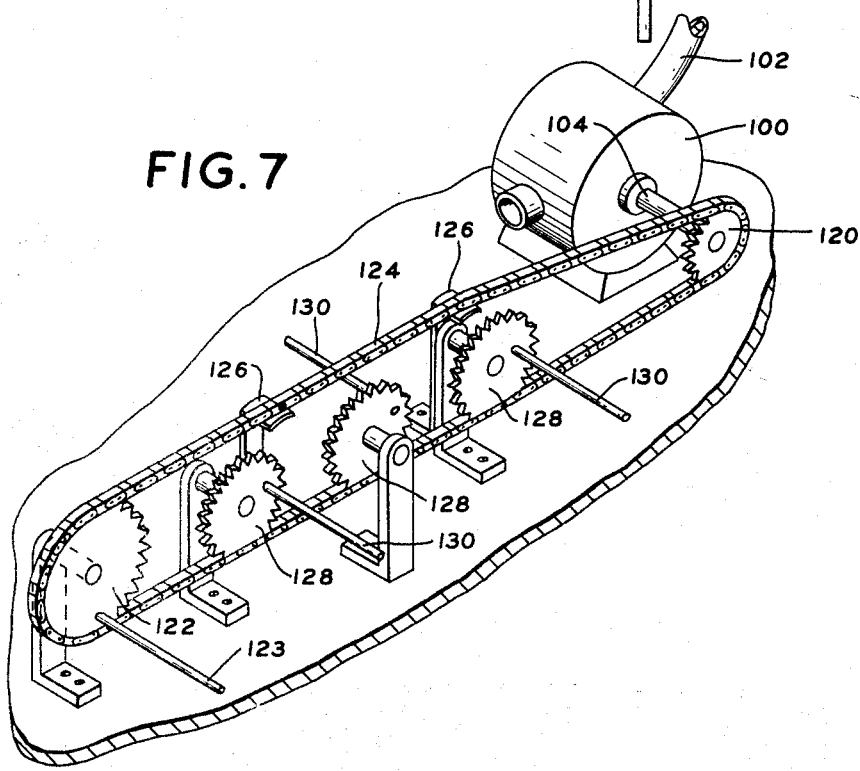
INVENTOR.
MORTON M. ROSENFELD
BY
*Arthur H. Seidel*
ATTORNEY

United States Patent Office 3,185,873
Patented May 25, 1965

3,185,873
GENERATOR AND VENTILATION MEANS
Morton M. Rosenfeld, Mount Vernon, N.Y.
(271 Madison Ave., New York, N.Y.)
Filed Oct. 19, 1961, Ser. No. 146,225
2 Claims. (Cl. 310—66)

This invention relates to a generator and ventilation means particularly adaptable for use in underground enclosures such as bomb shelters and the like.

In the event of a nuclear explosion, it is highly likely that individual residences, buildings and the like will not have a source of electrical potential necessary to provide illumination, for operation of radios and the like, etc. Accordingly, there is a need for a means for generating electricity in a bomb shelter. Bomb shelters are generally enclosed housings disposed below or partially below ground level. As a general rule, the housing of the bomb shelter is provided with door means so as to isolate the interior of the housing from atmosphere. Accordingly, a vent pipe is generally provided which provides communication between the interior of the housing and the atmosphere. A fan or blower must be provided so as to force circulation of air between atmosphere and the interior of the housing of the bomb shelter.

Manually operable blowers for the ventilation system of the bomb shelter have been suggested heretofore. However, such blowers suffer from a serious defect. The handle portion for manually rotating the fan blades of the blower is of insufficient length. That is, the handle portion has a length which enables only one person to manually operate the same. The manually operable blowers proposed heretofore fail to take into consideration that the only persons who may be available for operating the blower are women and children. In accordance with the present invention, the handle portion on the blower is of sufficient length so that two women or children may simultaneously operate the same.

In accordance with the present invention, a fly wheel is provided to start off the rotary energy imparted to the fan blades of the blower. Also, the rotor of an electrical generator is directly or mechanically connected to the shaft on which the fan blades of the blower are secured. Thus, as the blower is operated to cause circulation of air, electricity is being generated and stored in a battery for immediate or future use.

It is an object of the present invention to provide a novel generator and ventilation means.

It is another object of the present invention to provide a shaft interconnected with a blower and a generator so that a handle portion on said shaft may be manually rotated to cause forced circulation of air and simultaneously generate electricity.

It is another object of the present invention to provide a generator and ventilation means for use in bomb shelters or the like wherein two or more persons may combine their energy to manually generate electricity and cause circulation of air within the bomb shelter.

It is another object of the present invention to provide a generator and a blower on the same shaft or different interconnected shafts with manual means for operating the blower and generating electricity.

It is still another object of the present invention to structurally interrelate a generator, blower and fly wheel so that one or more persons may operate the blower and generate electricity by manually rotating a handle.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a diagrammatic perspective view of one embodiment of the present invention.

FIGURE 2 is a diagrammatic perspective view of another embodiment of the present invention.

FIGURE 3 is a diagrammatic perspective view of another embodiment of the present invention.

FIGURE 4 is a diagrammatic perspective view of another embodiment of the present invention.

FIGURE 5 is a longitudinal sectional view of another embodiment of the present invention.

FIGURE 6 is a plan view, partly in section, of another embodiment of the present invention.

FIGURE 7 is a perspective view of another embodiment of the present invention.

Referring to the drawing in detail, wherein like numerals indicate like elements, there is shown in FIGURE 1 a generator and ventilation means designated generally as 10.

The generator and ventilation means 10 is particularly adapted for use in a bomb shelter or similar underground enclosure wherein the problems of generating electricity and providing circulation of air are present. The generator and ventilation means 10 comprises a shaft 12 rotatably supported in fixed bearings 14. The shaft 12 extends through a fan or blower 16 having its inlet side in communication with atmosphere above ground level by means of a vent pipe 18. The blower 16 is provided with an outlet 20. The outlet 20 is adapted to convey fresh air to the interior of the bomb shelter or the like.

The housing of the blower 16 is partially broken away in FIGURE 1 to illustrate the fan blades 22 fixedly secured to the shaft 12. Thus, as the shaft 12 rotates the fan blades 22 will rotate. A fly wheel 24 is fixedly secured to the shaft 12 at any convenient point such as between the blower 16 and the bearing 14. One end of the shaft 12, the righthand end illustrated in FIGURE 1, terminates in a handle portion 26. A second handle portion 28 is provided on the opposite side of the blower 16 from the handle portion 26. The handle portions 26 and 28 facilitate rotation of the shaft 12 by two or more persons who individually might not have sufficient strength to singularly rotate the shaft 12.

The end of the shaft 12 remote from the handle portion 26 terminates in a generator 30. The rotor, not shown, of the generator 30 is fixedly secured to the shaft 12. Thus, the rotor rotates with the shaft 12. As the rotor rotates, it generates a source of potential in a conventional manner. The collector brushes of the generator 30 are connected to a battery 32 by wires. The battery 32 may be connected to any one of a plurality of electrical devices such as lamps, radios, etc.

The generator and ventilation means 10 may be supported in any convenient location at a point approximately four feet from the level of the floor of the bomb shelter. The outlet 20 of the blower 16 is in direct communication with the interior of the bomb shelter. The end of the vent pipe 18 which is not illustrated is adapted to extend to a point above ground level and be provided with a filtered hood. When it is desired to cause fresh air to flow into the interior of the bomb shelter, the handle portion 26 and/or handle portion 28 are manually rotated thereby imparting a rotary motion to the shaft 12. Since the fan blades 22 and the rotor of the generator 30 are fixedly secured to the shaft 12, rotation of the shaft 12 simultaneously generates electricity and causes circulation of air. As a practical matter, the battery 32 may be the batteries of a portable radio or the like which need recharging.

There is disclosed in FIGURE 2 another embodiment of the present invention designated generally as 40. The generator and ventilation means 40 is identical with the generator and ventilation means 10 except as will be made clear hereinafter. Thus, the fan blades for the blower 16, the fly wheel 24 and the rotor of the generator 30 are mounted on a common shaft 42. The shaft 42 is provided with an offset elongated handle portion 44. The handle portion 44 is of sufficient length so that at least two persons may simultaneously rotate the same. The embodiment illustrated in FIGURE 2 is adapted to be accommodated in spacial requirements within the bomb shelter which would not accommodate the embodiment illustrated in FIGURE 1.

In FIGURE 3, there is illustrated another embodiment of the present invention designated generally at 50. The generator and ventilation means 50 is identical with the generator and ventilation means 10 except as will be made clear hereinafter. The blower 16, the fly wheel 24 and the rotor of the generator 30 are mounted on a common shaft 52. The shaft 52 will be rotatably supported at an elevated position thereby accommodating spacial requirements in the bomb shelter. It is impractical to manually rotate the shaft 52 by means of a handle portion thereon since the shaft 52 will be located in a plane approximately six to eight feet above the level of the floor. Thus, a sprocket 54 is fixedly secured to one end of the shaft 52.

A sprocket 56 is rotatably supported on a shaft positioned approximately four to five feet above the floor of the bomb shelter. The sprocket 56 is substantially larger than the sprocket 54. A flexible member such as chain 58 extends around the peripheries of the sprockets 54 and 56. A handle portion 59, such as an elongated rod, extends from a side face of the sprocket 56 in a direction substantially perpendicular to the plane of the sprocket 56. The handle portion 59 is secured to the sprocket 56 adjacent its outer periphery. Thus, rotation of the handle portion 59 about a center of rotation coincident with the rotary support for the sprocket 56 causes the sprocket 56 to rotate. Such rotation of the sprocket 56 is imparted to the sprocket 54 by means of the chain 58. Since the sprocket 54 is fixedly secured to the shaft 52, the shaft 52 rotates thereby causing circulation of air and recharging of the battery 32.

In FIGURE 4, there is illustrated another embodiment of the present invention which is similar to the embodiment illustrated in FIGURE 2. The generator and ventilation means 60 is identical with the generator and ventilation means 40 except as will be made clear hereinafter. The fan blades of the blower 16 are fixedly secured to a shaft 62 which extends to either side of the blower 16. An elongated handle portion 64, similar to handle portion 44, is connected to an offset with respect to the shaft 62.

A gear 66 is fixedly secured to the shaft 62. A gear 68 is fixedly secured to a rotatably mounted shaft 70. The gears 66 and 68 are in meshing engagement. One end of the shaft 70 terminates in the rotor of the generator 30. The gear 66 is substantially larger than the gear 68 so as to take advantage of the mechanical action and enable the gear 66 to function as a fly wheel. The offset nature of the shafts 62 and 70 enables the embodiment illustrated in FIGURE 4 to be accommodated with spacial requirements which cannot be met by the other embodiments illustrated in FIGURES 1–3. In view of the above, it is believed that the operation of the embodiment illustrated in FIGURE 4 will be obvious.

In each of the embodiments of the present invention, the fly wheel acts as a means for storing the rotary energy of the shaft on which the fan blades are fixedly secured. It will be appreciated that the illustrations in FIGURE 4 are merely diagrammatic and that bearing supports, not shown, will be provided at various points along the rotary shafts. While the illustrations in the drawing disclose the blower 16 as being a means for causing air to flow into the bomb shelter, it will be appreciated that the blower 16 could be an exhaust blower for the bomb shelter.

In FIGURE 5, there is illustrated another embodiment of the present invention designated generally as 75. The generator and ventilation means 75 is identical with the generator and ventilation means 10 except as will be made clear hereinafter. The generator and ventilation means 75 includes a pair of cup-shaped housings 76 and 78. The housings 76 and 78 are provided with radially extending flanges adapted to be clamped together with a separator plate 80 disposed therebetween. A shaft 82 extends through aligned holes in the housings 76 and 78. The shaft 82 terminates in offset handle portions 84.

The housing 78 constitutes the blower and includes fan blades 86 fixedly secured to the shaft 82. A fly wheel 88 is fixedly secured to the shaft 82 and disposed on the opposite side of the separator wall 80 from the fan blades 86. A generator is disposed within the cup-shaped housing 76 and includes a rotor 90 fixedly secured to the shaft 82. Brushes 92 are coupled to the rotor 90 and have wires extending therefrom through the housing 76. The wires extending from the brushes 92 may be connected to a battery for recharging the same. The embodiment illustrated in FIGURE 5 is compact, simple to construct, and easy to install.

There is disclosed in FIGURE 6 another embodiment of the present invention. The blower 100 is provided with an inlet connected to the vent pipe 102. A shaft 104 extends across the interior of the blower 100 and is rotatably mounted with one end extending therebeyond. A fan blade 106 and a fly wheel 108 are secured to the shaft 104.

A beveled gear 110 is secured to the end of shaft 104. Gear 110 is in meshing engagement with beveled gear 112. Gear 112 is rotatably supported by axle 114. Gear 112 is longer than gear 110 and is manually rotated by handle 116. Handle 116 is preferably long enough so that at least two persons may rotate the same while standing side by side.

Another embodiment of the present invention is illustrated in FIGURE 7. A sprocket 120 is substituted for the gear 110 on shaft 104. A sprocket 122, longer than sprocket 120, is rotatably supported by a bracket. A flexible member such as chain 124 extends around the sprockets 120 and 122. Suitable guides 126 maintain an intermediate portion of the chain 124 taut. The guides 126 facilitate the provision of a plurality of sprockets 128 in meshing engagement with chain 124. The sprockets 128 are smaller than sprocket 122 but larger than sprocket 120. A suitable bracket is provided to rotatably support the sprockets 128.

The sprocket 122 is manually rotated by handle 123 and sprockets 128 are manually rotated by handles 130. In this embodiment, the manual efforts of a plurality of persons will be cumulatively coupled to the shaft 104 to operate the blower 100 and/or a generator.

It is within the scope of the present invention to use an alternator in place of the generator in the various embodiments illustrated.

The present invention may be embodied in other specific forms without departing from the spirit or essential attributes thereof and, accordingly, reference should be made to the appended claims, rather than to the foregoing specification as indicating the scope of the invention.

I claim:
1. Apparatus comprising a pair of cup-shaped housings having their opened ends juxtaposed to one another with a separator plate disposed therebetween, coupling means coupling the open ends of said cup-shaped housing with said separator plate therebetween in a closed unitary structure, a rotatably mounted shaft extending through aligned holes in said housings and separator plate, fan blades secured to said shaft within one of said housings, a generator disposed within the other of said housings, said generator including a rotor fixedly secured to said shaft, a fly wheel secured to said shaft within said closed structure, and manual means for rotating said shaft, said manual means including extensions of said shaft extending outside of both of said cup-shaped housings, said shaft extensions having handles thereon for enabling persons on opposite sides of said structure to rotate said shaft.

2. Apparatus in accordance with claim 1 wherein said fly wheel is secured to said shaft within the other of said housings.

References Cited by the Examiner
UNITED STATES PATENTS
1,209,267   12/16   Davis _____ 322—4

FOREIGN PATENTS
308,217   5/33   Italy.

MILTON O. HIRSHFIELD, *Primary Examiner.*
LAURENCE V. EFNER, *Examiner.*